INVENTOR.
JOSEPH T. WLOSZEK
BY Tilberry & Body
ATTORNEYS

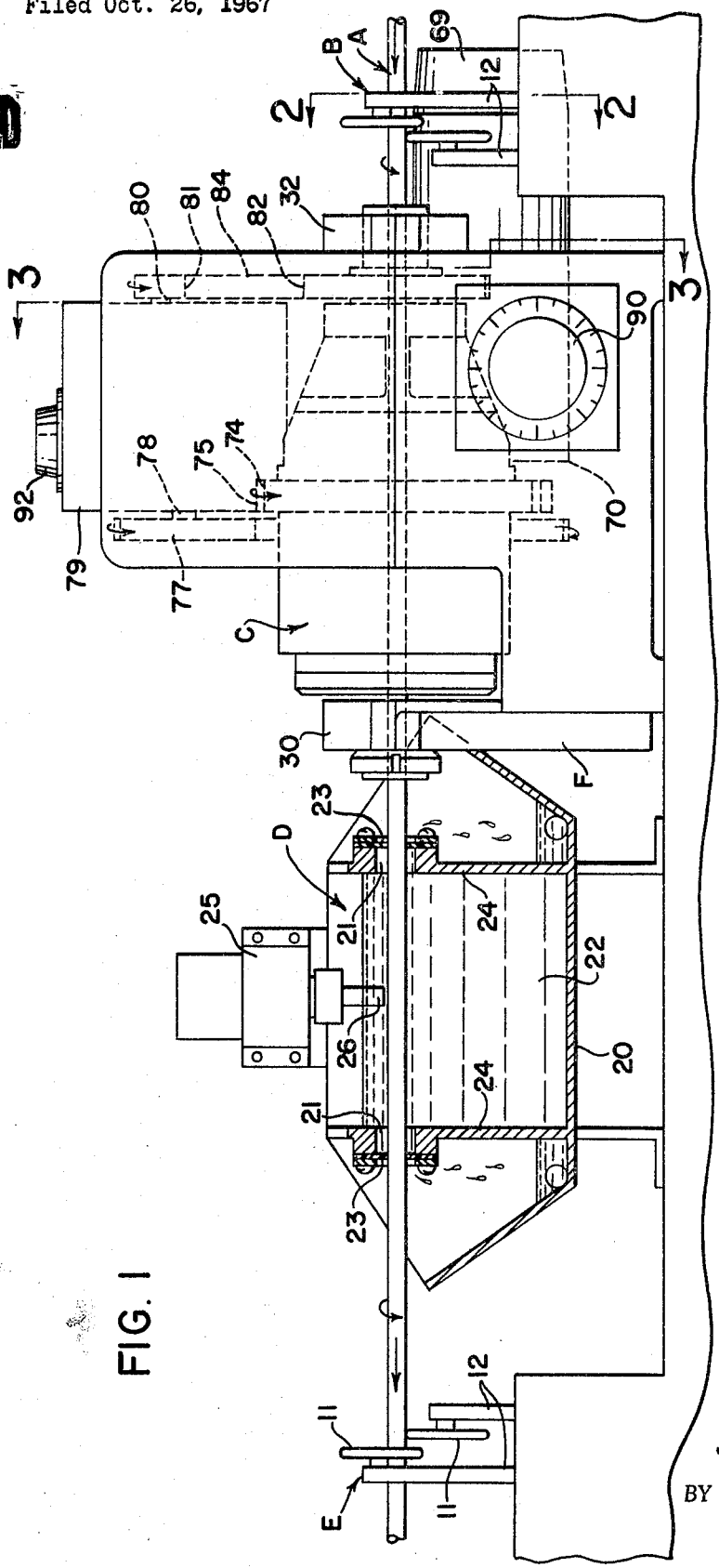

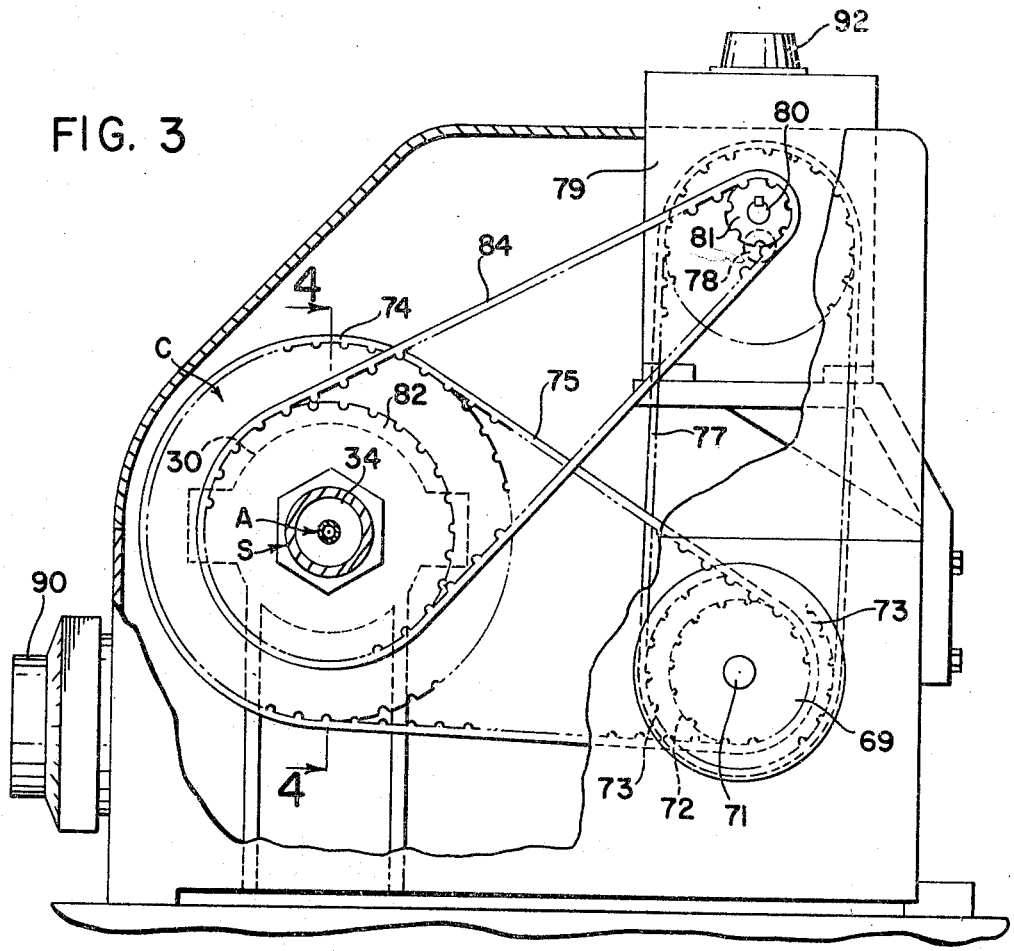
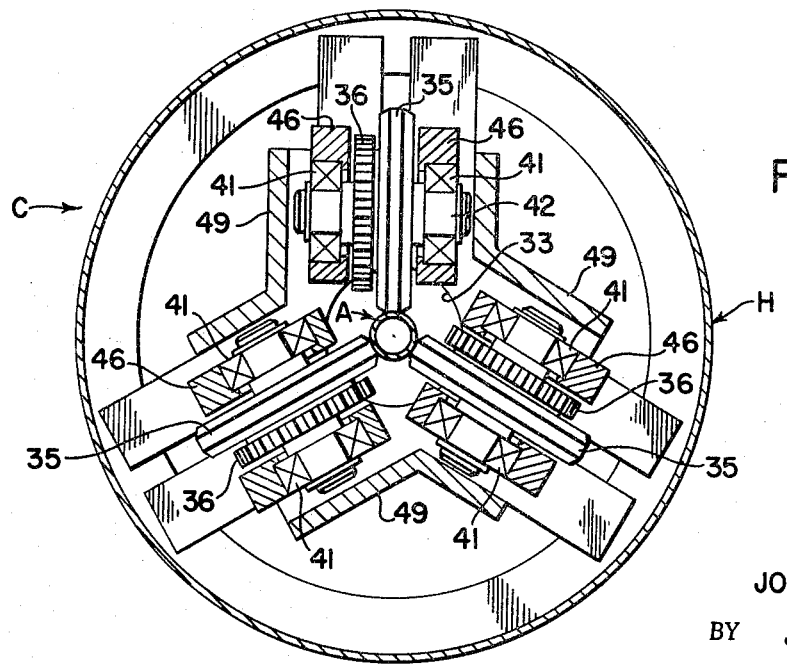

June 30, 1970　　J. T. WLOSZEK　　3,517,844
FEEDER FOR ELONGATED BARS OR TUBES
Filed Oct. 26, 1967　　5 Sheets-Sheet 4

INVENTOR.
JOSEPH T. WLOSZEK
BY Tilberry & Body
ATTORNEYS

United States Patent Office 3,517,844
Patented June 30, 1970

---

3,517,844
FEEDER FOR ELONGATED BARS OR TUBES
Joseph T. Wloszek, Cuyahoga, Ohio (% Custom Machine, Inc., 9200 George Ave., Cleveland, Ohio 44105)
Continuation-in-part of application Ser. No. 488,649, Sept. 20, 1965. This application Oct. 26, 1967, Ser. No. 691,078
Int. Cl. B65h 5/06
U.S. Cl. 214—338       10 Claims

ABSTRACT OF THE DISCLOSURE

A machine for simultaneously rotating and advancing an elongated workpiece through an ultrasonic inspection station. A head has rollers mounted thereon which acts to move the workpiece in a longitudinal direction. This head rotates to rotate the workpiece. A first, manually adjustable, continuously variable speed power transmission rotates the head and a second manually adjustable variable speed power transmission driven by the first enables the workpiece to be advanced or held stationary at any desired pitch while the speed of rotation is varied.

---

This application is a continuation-in-part of U.S. application Ser. No. 488,649 filed Sept. 20, 1965.

This invention pertains to the art of bar or tube feeding and more particularly to mechanism for simultaneously rotating and feeding an elongated member at controlled rates past a work station.

The invention is particularly applicable to moving a hollow tube past an ultrasonic flaw detection station and will be described with particular reference thereto, although it will be appreciated that it may be used with solid elongated workpieces and that eddy current testing, polishing, visual examination, or other work may be performed thereon.

In the art of ultrasonic examining of an elongated tube, it is conventional to move such tube longitudinally past a work station at which an ultrasonic transducer is located while at the same time rotating the tube to in effect obtain a spiral scan of the entire surface of the tube. Difficulty has been experienced in the past in controlling the rate of movement past the station either in the longitudinal direction or in a rotational direction and difficulty has been experienced in stopping the longitudinal movement while continuing the rotational movement or in varying the longitudinal movement in such a manner that the longitudinal movement can be readily slowed, stopped or reversed so that a particular area on the tube can be examined in great detail. Also obtaining accuracy and uniformity in the pitch of movement has been a problem.

The present invention contemplates apparatus which overcomes these difficulties and enables the speed of longitudinal movement, either advancing or retracting of an elongated workpiece such as a rod or tube to be readily and accurately controlled at all times while at the same time continuing the rotation of the rod or tube past a work station.

In accordance with the present invention, there is provided roller means having an axis of rotation at right angles to and spaced from the longitudinal axis of the workpiece and arranged so as to grip the sides of the workpiece, means for supporting the rollers as a group for rotation about the axis of the workpiece and power source means for simultaneously rotating the rollers about both the workpiece longitudinal axis and the roller axes for simultaneously rotating the workpiece and moving it longitudinally in either direction, such power source means including a first manually and continuously adjustable speed power transmission having an output which rotates the rollers as a group about the workpiece axis and drives a second manually and continuously adjustable speed power transmission in turn driving said rollers about their axis, the output speed of the second transmission being so adjustable relative to the speed of the first transmission that the rollers may be made to rotate in either direction about their axes whereby the workpiece may be made to advance, retract or remain stationary relative to its axis at any pitch while continuing to be rotated at any desired speed. The controls for such transmissions are made readily accessible to the front of the apparatus and may be calibrated in r.p.m. and pitch.

Further in accordance with the invention, mechanism is provided for simultaneously rotating an elongated workpiece such as a tube or rod about its longitudinal axis and moving the workpiece from a forward through stop to a backward direction along its longitudinal axis, such mechanism including a housing having a longitudinal passage and supported for rotation about the axis of such passage, a sleeve coaxial with the housing extending thereinto and rotatable about such axis independently of the housing, such sleeve having helical gearteeth on its inner end, a plurality of rollers adapted to grip the workpiece and having an axis of rotation transverse to the length thereof, such rollers as a group being rotatable with the housing, a gear in engagement with the helical gearteeth of the sleeve and operatively associated with the rollers to rotate same about their axis such that a difference in speed of rotation between that of the housing and the sleeve causes the gears and rollers to rotate at a speed proportional to the difference whereby the longitudinal speed of the tube can be readily controlled by controlling the difference in speed of rotation of the housing and the sleeve.

Further in accordance with the invention, the housing is rotated from a first variable speed power source and the sleeve is rotated from the output of the first power source through a variable speed transmission.

Further in accordance with the invention, the rollers are supported within the housing for radial movement relative to the rod while still remaining actively associated with their driving gears so that various size workpieces may be readily accommodated.

The principal object of the invention is the provision of a new and improved feeding mechanism for elongated rod or tube workpieces which enables the speed of movement of the workpiece past a work station to be readily varied from advance to stop to retract while continuing the rotation of the tube.

Another object of the invention is the provision of a new and improved mechanism which enables the operator to obtain extremely accurate control of the longitudinal movement of the rod or tube.

Another object of the invention is the provision of a new and improved mechanism which will readily accommodate a wide range of rod or tube diameters.

Another object of the invention is the provision of a new and improved apparatus for moving tubes or rods past a work station which is relatively simple in construction, economical to manufacture and is highly durable in use.

Another object is a mechanism for feeding a tube or rod past a work station which permits a wide range of ratios of rotational to longitudinal speeds, has no backlash, and wherein once the ratio is established may be maintained even though the rotational speed is varied.

The invention may take physical form in certain parts and arrangement of parts, a preferred embodiment of which will be described in detail in this specification and illustrated in the accompanying drawings which form a part hereof and wherein:

FIG. 1 is a side-elevational view, partly in section, of apparatus for ultrasonically examining an elongated rod or tube and illustrating a preferred embodiment of the invention;

FIG. 2 is a fragmentary cross-sectional view of FIG. 1 taken approximately on the line 2—2 thereof;

FIG. 3 is a cross-sectional view of FIG. 1 taken approximately on the line 3—3 thereof and showing the arrangement of the drive belts;

FIG. 7 is a view similar to FIG. 6 but taken approximately on the line 7—7 of FIGS. 4 and 5;

Figure 4:
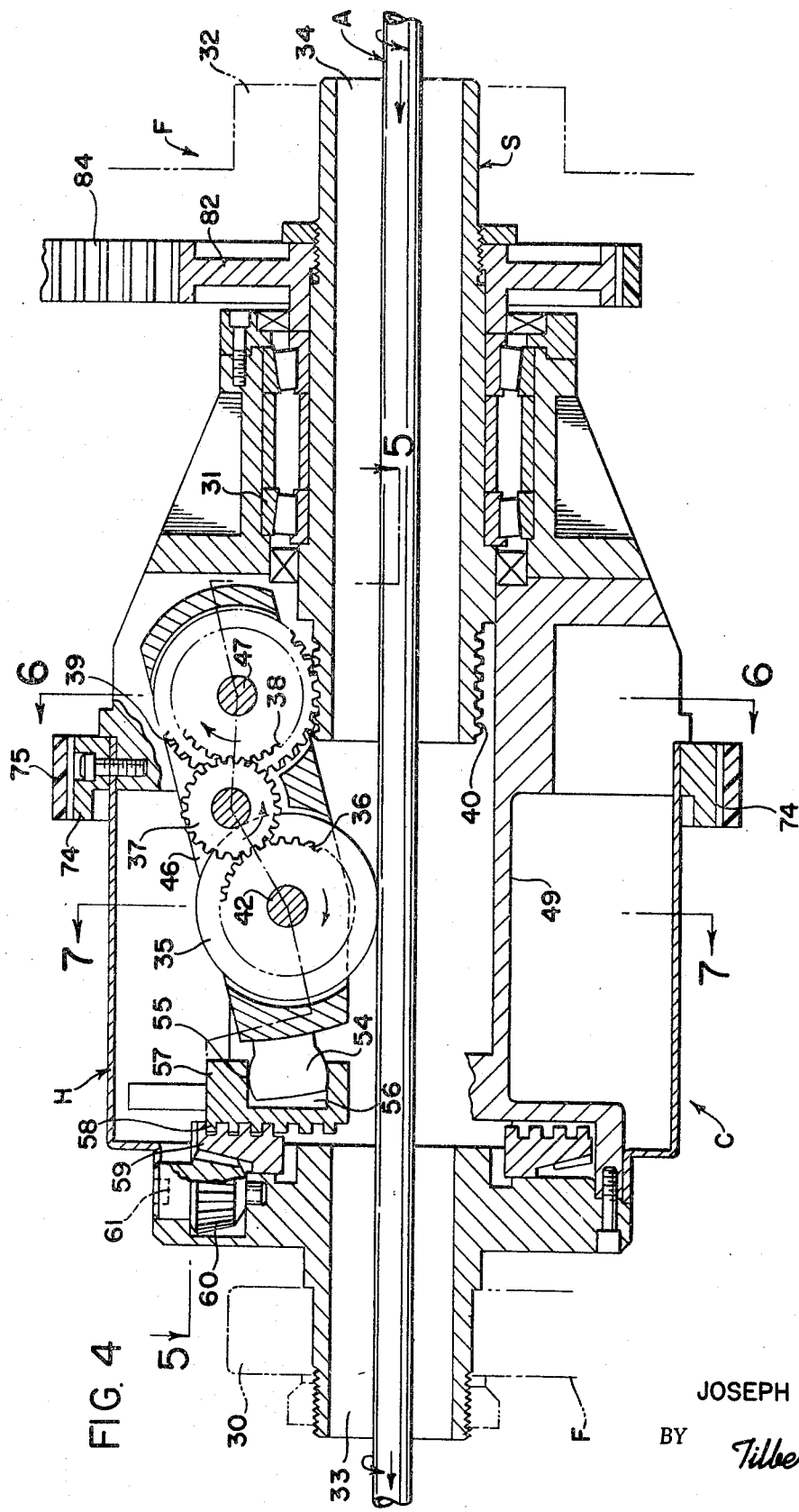
FIG. 4 is a cross-sectional view of the drive head of FIG. 1 taken approximately on the line 4—4 of FIG. 3.
Figure 5:
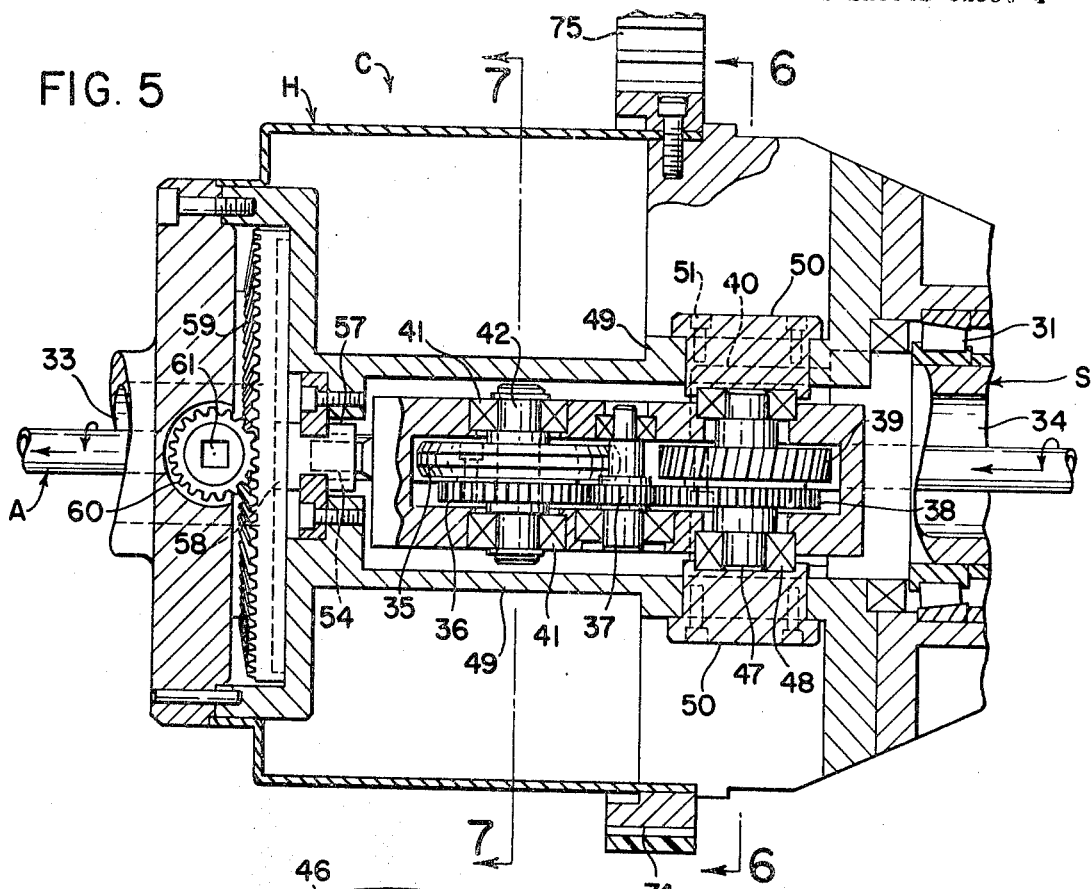
FIG. 5 is a view somewhat similar to FIG. 4 but taken at 90° relative thereto on the line 5—5 of FIG. 4.
Figure 6:
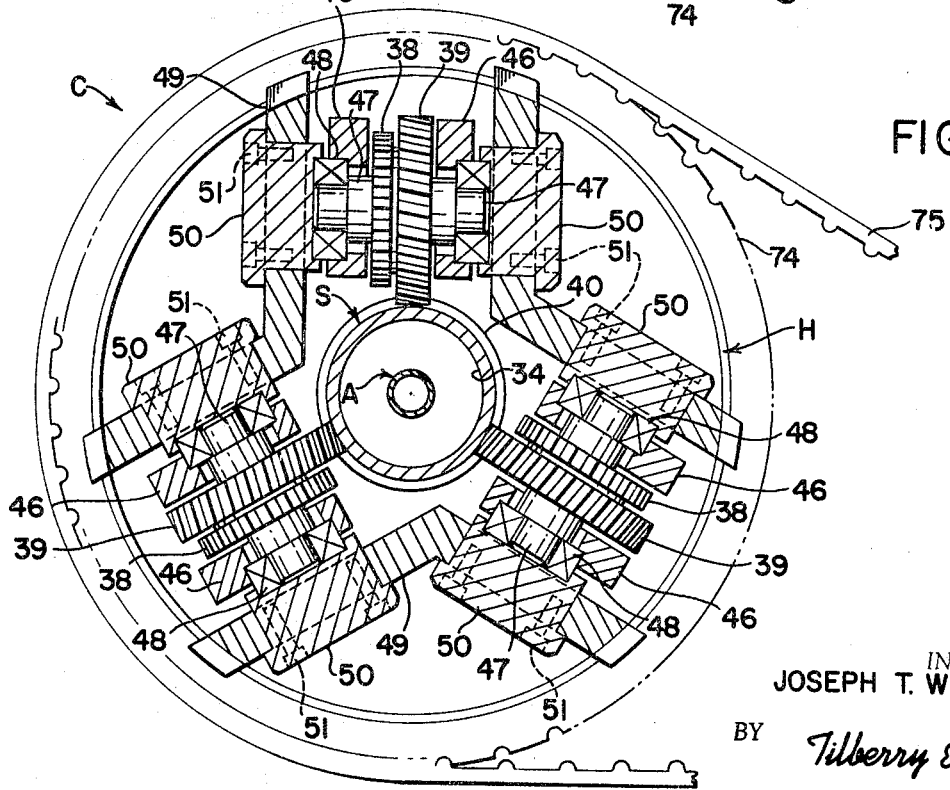
FIG. 6 is a cross-sectional view of FIGS. 4 and 5 taken approximately on the line 6—6 thereof.

Referring now to the drawings wherein the showings are for the purpose of illustrating preferred embodiments of the invention only and not for the purpose of limiting same, FIG. 1 shows a workpiece A being advanced from right to left past a supporting mechanism B, a rotating and driving mechanism C, work station D and supporting mechanism E.

The workpiece A may take any desired shape, e.g., square, hexagonal, oval or otherwise, but in the embodiment shown, is cylindrical in cross section and is in the shape of a tube. Obviously, it could also be a solid bar and may be of any desired material such as plastic, fiberglass, steel, bronze, copper stainless steel or the like.

The supporting mechanism B forms no part of the present invention and may take any desired form. In the embodiment shown, however, the mechanism is comprised of three rollers 11 mounted for rotation about an axis parallel to the longitudinal axis of the workpiece A and so positioned on suitable supporting brackets 12 as to support the workpiece A on the axis of the feed mechanism C and the ultrasonic examining station D. These rollers 11 may be supported for sideward movement so as to be able to accommodate various size workpieces.

The support mechanism E is similar in construction to that of the tube supporting mechanism B and will not be described further herein.

At the work station D, any one of a number of functions or examinations may be performed, e.g., machining, polishing flux, eddy current or visual, but in the preferred embodiment ultrasonic examination is to be carried out. Thus station D is comprised generally of a tank 20 filled with a liquid 22 such as water and having aligned passages 21 in opposite sidewalls 24 through which the workpiece A can pass. A gland 23 is provided across each of these passages 21 in sealing engagement with the surface of the workpiece A to prevent excess loss of the liquid 22 through these passages 21. These glands may take any desired construction and are simply shown as a rubber disc having a central opening and clamped across the ends of the passages 21.

Mounted on the side of the tank 20 is a mechanism 25 for adjustably supporting an ultrasonic transducer 26 below the surface of the liquid 22 and in close proximity to the surface of the workpiece A as it passes through the liquid 22. Obviously, a plurality of transducers may be employed. Such transducer 26 is ordinarily connected through electrical circuitry to visual audible mechanism for indicating the presence of flaws on the inside of the workpiece A as it passes through this portion of the apparatus.

Obviously, if other work is being performed at the work station D, the tank 20 may be eliminated.

The workpiece A must be both rotated and moved longitudinally so that the ultrasonic transducer 26 may scan its entire surface, it being obvious that as the workpiece is simultaneously rotated and moved longitudinally, the shape of the scan is that of a helix with the pitch of the helix being equal to the longitudinal movement of the workpiece for each complete revolution. Certain types of workpieces which must be very carefully examined must be advanced past the head with a very small pitch. Other workpieces may be advanced with a much larger pitch. Also, at times when a flaw is found, it is desirable to make the workpiece move backwards and then stop at a given point while continuing the rotation so that a given portion of the workpiece may be continuously examined for any desired length of time. Other functions may be performed on the workpiece A if desired.

The mechanism C is particularly adapted to permitting this function.

Referring now to FIG. 4, the mechanism for both rotating and moving the tube longitudinally is comprised generally of a housing H supported for rotation at its left end in a roller bearing 30 mounted in the frame F and at its right end by a bearing 31 mounted on an elongated sleeve S which extends outside of the housing H and is rotatably supported in a bearing 32 in turn supported in the frame F. It will thus be seen that the housing H and the sleeve S are supported for rotation independently of each other and have coaxial passages 33, 34 respectively through which the workpiece A can move.

Within the housing are a plurality of rollers arranged around the workpiece A with their axes of rotation perpendicular to and spaced from the longitudinal axis of the workpiece A and arranged so as to grippingly engage the external surface of the workpiece A. While any number of rollers 35 may be employed, in the embodiment of the invention shown, there are three each spaced 120° from the other. These rollers 35 are keyed for rotation to a gear 36 meshing with a pinion gear 37 in turn driven by a pinion 38. The pinion 38 is keyed for rotation with a worm pinion 39 in turn meshing with a helical worm 40 on the inner or left hand end of the sleeve S. Thus rotation of the sleeve S relative to the housing H will cause the rollers 35 to rotate and such rotation will, of course, move the workpiece A longitudinally through the passages 33, 34.

The rollers 35 and the gears 36, 37, 38 and 39 may be mounted for rotation in any suitable manner, but in the preferred embodiment, are mounted such that the roller 35 can be moved radially relative to the workpiece A. In the embodiment shown, the shafts for the rollers 35 are journaled in bearing 40 mounted in openings and the gears 36, 37, are rotatably supported by a pair of spaced arms 46 which arms are supported for articulate movement in the housing about the axis of shaft 47 which supports the gears 38, 39 for rotation. The shaft 42 for rollers 35 are mounted in bearings 41. The shaft 47 is supported for rotation in bearings 48 each in turn mounted in a recess in the end of caps 50 each in turn fastened in openings in spaced parallel extending webs 49 forming part of the housing H. These caps 50 are held in place by screws 51. To enable disassembly of the bearing 48, the caps 50 are moved outwardly on their axis in which instance the entire assembly can be freely removed. It is to be noted that the arms 46 are supported for articulated movement on the external surface of the bearing 48.

In accordance with the invention, means are provided for adjustably moving the opposite ends of the arms 46 so that the rollers 35 may be moved in and out to accommodate different diameter workpieces. This may be done in a number of ways but in the embodiment shown in FIG. 4, the left hand ends of the arms 46 are integrally joined by a base 54 which base has a cylindrical member 55 which extends into a socket opening 56 in the face of a slide member 57 supported for radial sliding movement in the housing H. Each slide member 57 is provided on its left hand surface with teeth 58 which mesh with helical teeth in a ring member 59 rotatably mounted in the left hand end of the housing H about the workpiece axis. This ring member 59 has a beveled gear on its left hand surface in turn engaged by a beveled pinion 60 supported for rotation in the housing H about a radial axis and having a wrench socket 61 in its outer surface such that rotation of the beveled pinion 60 rotates the ring 59 and moves the slides 57 inwardly and outwardly and thus the rollers 35 inwardly and outwardly. By means of this adjustment, the amount of pressure between the rollers 35 and the workpiece A can be readily adjusted and various diameters of workpieces A can be readily accommodated.

In accordance with the invention, power sources are provided for simultaneously rotating both the housing H and the sleeve S at any desired relative speed. Such power sources may be a variable speed motor or motors either coupled or uncoupled. In the preferred embodiment, however, a generally constant speed motor drives the housing through a first variable speed transmission which in turn drives a second variable speed transmission which drives the sleeve S. This arrangement may take a number of different forms, but in the embodiment of the invention shown, comprises an electric motor 69 driving a standard variable speed transmission 70 having an output shaft 71 on which are mounted speed transmission 70 having an output shaft 71 on which are mounted a first belt pulley 72 and a second belt pulley 73. The pulley 72 drives a belt pulley 74 fastened to the external surface of the housing H through a drive belt 75. The pulley 73 drives a belt pulley 77 mounted on the input shaft 78 of a conventional variable speed transmission 79 having an output shaft 80 keyed to a belt pulley 81 in turn driving a belt pulley 82 mounted on the right hand end of the sleeve S through a belt 84.

The belts and pulleys may take any desired form, but in the embodiment shown, have mating notches and ridges to insure a positive drive. Obviously, gears could also be employed or other types of positive powered transmitting mechanism.

The speed of rotation of the shaft 71 is controlled by a graduated knob 90 connected by a shaft, not shown, to the control shaft normally extending from such a variable speed transmission.

In the embodiment shown, the rotational speed of the input shaft 78 of the variable speed transmission 79 is the same as the rotational speed of the shaft 71 although it may be otherwise. The output speed of the shaft 80 in relation to the speed of the shaft 71 is adjusted by the control knob 92, it being noted that while the speed of rotation of the shaft 80 may be readily adjusted by adjusting the knob 92, its speed of rotation for any one setting of the knob 92 will always be directly proportional to the speed of rotation of the shaft 71.

OPERATION

In operation a workpiece A is positioned within the passages 33, 34 and the helical pinion 60 is rotated to move the rollers 35 radially inwardly so that they are in pressure engagement with the outer surfaces of the workpiece A.

If it be assumed that the variable speed mechanism 79 be adjusted so as to give an increase in speed to the pulley 81 over the speed of the pulley 72, such that the speed of rotation of the housing H and the sleeve S are exactly the same, the workpiece A will simply rotate and will have no longitudinal movement for the reason that the sleeve S is rotated at the same speed as the rotation of the gears 39 as a group and the gears 39 will not rotate about their own axis.

However, if it be assumed that the housing H continues to rotate but the variable speed mechanism 79 be so adjusted that the pulley 81 is stopped from rotation, the sleeve S will correspondingly be stopped from rotation. In such instance, the gears 39 are rotating as a group about the axis of the workpiece A and the gears 39 will rotate. Such rotation is transmitted to the rollers 35 through pinion gears 38, 37 and 36. The rollers 35 will rotate in a clockwise direction and the workpiece A will be advanced from right to left through the passages 34, 33. Of course, simultaneously the workpiece A will be rotated due to the rotation of the housing H. Now if the speed of rotation of the pulley 82 is gradually increased, the relative speed of rotation of the gears 39 on the sleeve S will decrease with the result that the speed of rotation of the rollers 35 will also decrease until such time as the speed of the rotation of the sleeve S and the housing H become the same when the workpiece A will cease advancing longitudinally through the passages 34, 33. If the increase in speed of the sleeve S is increased so that it is rotating faster than the housing H, the result will be that the rollers 35 will rotate in a counterclockwise direction and the workpiece A will be moved from left to right through the passages 33, 34. That is to say, in a rearward or retracting direction.

It will thus be seen that by adjusting the speed of rotation of the sleeve S relative to the speed of rotation of the housing H so that it is either greater, the same or less, the workpiece A may be made to retract, remain stationary or advance along its longitudinal axis. The pitch of the scanning helix may thus be readily controlled by controlling the relative speed of rotation of the sleeve S in the housing H. Once this pitch is determined, then the speed of rotation of the housing H may be readily varied by adjusting the knob 90 but the pitch of scanning will remain exactly the same. Using the invention, microscopic adjustments of the workpiece A in a forward or retracting direction can be readily obtained.

Figure 8:
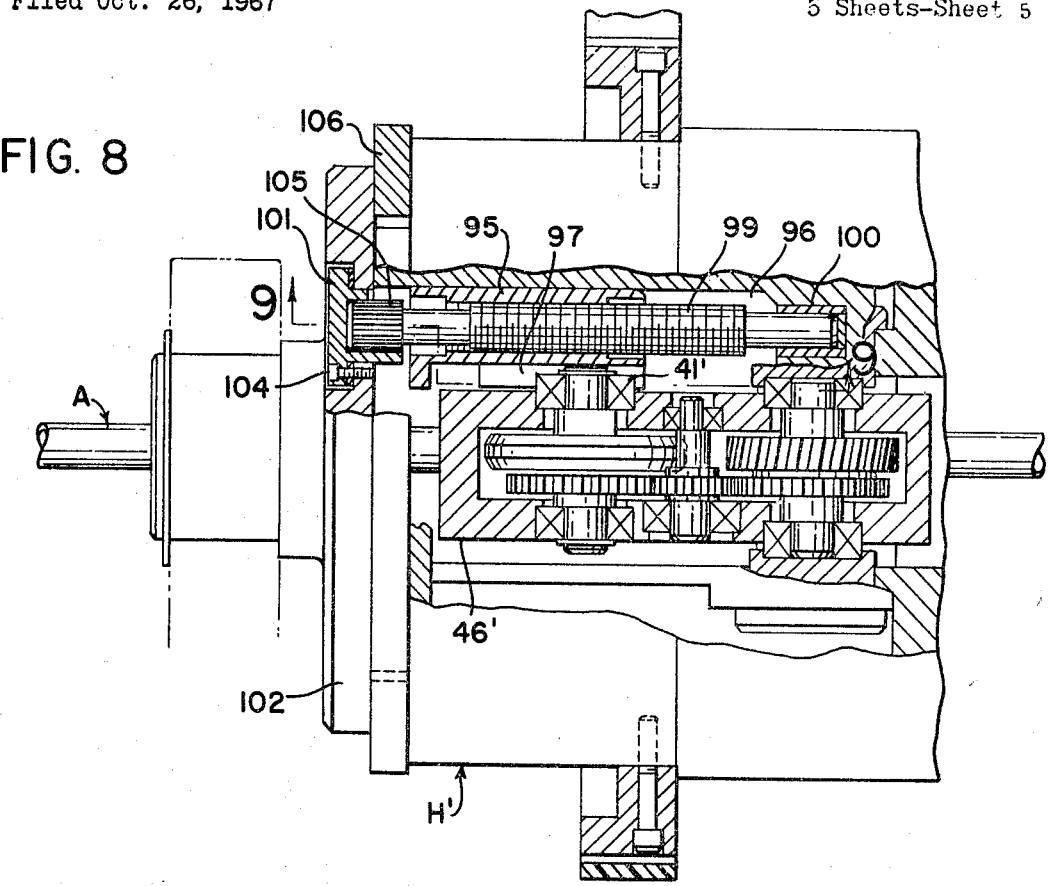
FIG. 8 is a fragmentary view similar to FIG. 1 showing an alternative embodiment of the invention; and, FIG. 9 is a view of FIG. 8 taken on the line 8—8 thereof.
Figure 9:
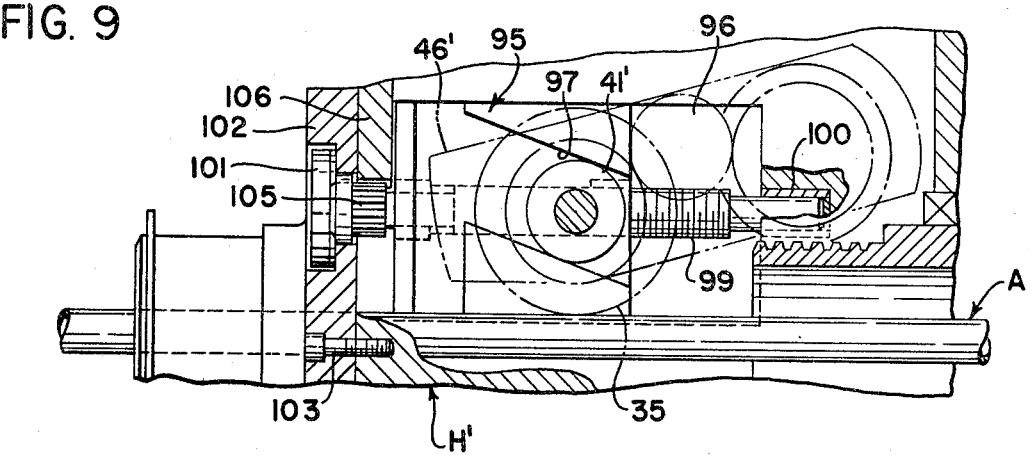

FIGS. 8 and 9 show an alternative arrangement for radially adjusting the left ends of the three arms 46 to accommodate different diameters of workpiece. In these figures, like pieces will be designated with like numbers and similar pieces will be designated with like numbers with a prime mark added. In this embodiment, one of the bearings 41' for shaft 42 is mounted in its respective arm 46' so as to project a short distance beyond the outer surface thereof. This projecting portion of bearing 41', as will appear, serves as a cam follower.

A cam member 95 is slidably mounted on a line parallel to the line of movement of the workpiece A in a groove 96 formed in the housing H'. This cam 95 has a cam groove 97 extending at an angle to the line of movement, generally as is shown in FIG. 9, such that as the cam 95 is moved back and forth, the bearing 41' and arms 46' will be moved upwardly and downwardly as viewed in FIG. 9, thus moving the rollers 35 radially inwardly and outwardly relative to the outer surface of the workpiece A.

The cam 95 is moved in its groove 96 by means of a longitudinally extending threaded shaft 99 extending through a threaded opening in the side of the cam 95 opposite from the groove 97, which shaft 99 is journaled in its right hand end in the housing H' by means of a sleeve bearing 100. The left hand end of the shaft 99 is journaled in the socket of a cap 101, fastened by means of screws 104 in a counterbore in the left hand face of a plate 102 which is fastened to the left end of the housing H' by means of bolts 103. The left hand end of the shaft 99 is provided with gearteeth 105 which engage internal teeth of a ring gear 106 which is supported for rotation in a groove formed between the right hand side of the face plate 102 and the left hand end of the housing H'. This gear 106 has an outer periphery extending slightly beyond the outer periphery of the housing H' and may be rotated which in turn rotates the shafts 99 to move the cam members 95 back and forth to adjust the position of the rollers 35. Suitable scale markings not shown may be provided on the gear 106 to indicate the position of the rollers 35. Also suitable means, not shown, are provided to clamp the gear 106 in any adjusted position.

The invention has been described with reference to a preferred embodiment. Obviously modifications and alterations will occur to others upon a reading and understanding of this specification and it is my intention to include all such modifications and alterations insofar as they come within the scope of the appended claims.

Having thus described my invention, I claim:

1. Mechanism for simultaneously rotating an elongated workpiece and moving it longitudinally relative to a work station, said mechanism including a housing having an open ended workpiece receiving passage and supported for rotation about the axis of such passage, said housing having an external driving surface, a sleeve having an open ended passage extending into the housing passage coaxial therewith, and rotatable about such axis independently of the housing, such sleeve having helical gear teeth on its inner end and a driving surface on its outer end, a plurality of rollers in said housing adapted to grip the workpiece and having an axis of rotation perpendicular to and spaced from the workpiece axis, such rollers as a group being rotatable with the housing, gear members one for each roller mounted for rotation about an axis perpendicular to and spaced from the axis of said passage in engagement with the helical gear teeth of the sleeve, and each gear being in the same plane as its associated roller operatively associated with its roller to rotate same about its axis such that a difference in speed of rotation between that of the housing and the sleeve causes the gears and rollers to rotate at a speed proportional to the difference whereby the longitudinal speed of the tube can be readily controlled by controlling the difference in speed of rotation of the housing and the sleeve.

2. The apparatus of claim 1 including power means, a first variable speed transmission connected to said power means and having an output member, the speed of rotation of which may be varied with relation to the speed of rotation of the power means, said output member being operatively associated with the driving member on said housing, a second, variable speed transmission having an input member operatively associated with the output member of said first variable speed transmission means, said second transmission means having an output member, the speed of which is continuously variable with relation to its input member and operatively associated with the driving surface on said sleeve.

3. The mechanism of claim 1 wherein said rollers are supported within the housing for radial movement relative to the workpiece about an axis of said gear member and means for moving said rollers radially into gripping engagement with the workpiece.

4. In mechanism for simultaneously rotating and moving an elongated workpiece longitudinally past a work station, said mechanism including a housing having an elongated open ended passage through which the workpiece moves longitudinally, means at one end of said housing supporting it for rotation, a sleeve extending into said housing from the opposite end and supported for rotation externally of said housing, bearing means between said housing and said sleeve for supporting said housing for rotation relative to said sleeve, said sleeve having a helical gear on its end in said housing, a gear having an axis of rotation perpendicular to and spaced outwardly from the axis of said helical gear engaged with said helical gear, means mounting said gear for rotation about its axis in said housing, a roller member adapted to engage the external surface of the workpiece in said housing and having an axis of rotation parallel to the axis of said gear, said roller and gear being in the same plane and operatively associated whereby rotation of said gear rotates said roller when said housing is rotated relative to said sleeve.

5. Apparatus of claim 4 wherein said roller is radially movable in an arcuate path about the axis of said gear and means in said housing for moving said roller radially.

6. Apparatus of claim 4 wherein means are provided for simultaneously rotating said housing and said sleeve at controllable different rotational speeds, said means including a variable speed transmission having an input member operatively associated with said housing and an output member operatively associated with said sleeve.

7. The apparatus of claim 4 wherein a variable speed transmission is provided for rotating said housing at controllable rotational speed.

8. The apparatus of claim 4 wherein a variable speed motor drives said housing and a second variable sleeve drives said sleeve.

9. In mechanism for simultaneously rotating and moving an elongated workpiece longitudinally past a work station, said mechanism including a housing having an elongated open-ended passage through which the workpiece moves longitudinally, means at one end of said housing supporting it for rotation, a sleeve extending into said housing from the opposite end and supported for rotation externally of said housing, bearing means between said housing and said sleeve for supporting said housing for rotation relative to said sleeve, said sleeve having helical gear on its end in said housing, a gear member having an axis of rotation perpendicular to and spaced outwardly from the axis of said helical gear and engaged with said helical gear, means mounting said gear for rotation about its axis in said housing, an arm in said housing mounted for pivoting about the axis of said gear member, a roller member adapted to engage the external surface of the workpiece in said housing and mounted for rotation in said arm on an axis of rotation parallel to the axis of said gear member, said roller member and gear member being operatively associated whereby rotation of said gear member rotates said roller member when said housing is rotated relative to said sleeve, and means for adjustably moving the portion of said arm supporting said roller member radially inwardly and outwardly comprising a ring member mounted for adjustment in said housing about the longitudinal axis and having axially facing threads, a follower member having axially facing threads engaged therewith and movable radially when said ring member is rotated relative to said housing, and means interengaging said follower member with a portion of said arm spaced from the axis of said gear member.

10. In mechanism for simultaneously rotating and moving an elongated workpiece longitudinally past a work station, said mechanism including a housing having an elongated open-ended passage through which the workpiece moves longitudinally, means at one end of said housing supporting it for rotation, a sleeve extending into said housing from the opposite end and supported for rotation externally of said housing, bearing means between said housing and said sleeve for supporting said housing for rotation relative to said sleeve, said sleeve having helical gear on its end in said housing, a gear member having an axis of rotation perpendicular to and spaced outwardly from the axis of said helical gear and engaged with said helical gear, means mounting said gear for rotation about its axis in said housing, an arm in said housing mounted for pivoting about the axis of said gear member, a roller member adapted to engage the external surface of the workpiece in said housing and mounted for rotation in said arm on an axis of rotation parallel to the axis of said gear member, said roller member and gear member being operatively associated whereby rotation of said gear member rotates said roller member when said housing is rotated relative to said sleeve, and means for adjustably moving the portion of said arm supporting said roller member radially inwardly and outwardly comprising a ring member mounted for adjustment in said housing about the longitudinal axis and having radially inwardly facing teeth, a cam member slidably mounted in said housing on a longitudinal axis, a follower member on said arm spaced from the axis of said gear member and engageable with said cam member, a threaded shaft having a longitudinal axis and threadably engaged with said cam member, said shaft having gear teeth at one end engaged with said radially inwardly facing gear teeth whereby rotation of said ring member rotates said shaft and moves said cam and follower.

References Cited

UNITED STATES PATENTS

| | | | |
|---|---|---|---|
| 2,316,117 | 4/1943 | Tilley | 214—338 |
| 2,429,201 | 10/1947 | Connor | 214—338 |

RICHARD A. SCHACHER, Primary Examiner